US007909272B2

(12) United States Patent
Thijssen et al.

(10) Patent No.: US 7,909,272 B2
(45) Date of Patent: Mar. 22, 2011

(54) MILLING PROCESS

(75) Inventors: Marc Thijssen, Overijse (BE); Maxime Franc, Saint-Nicolas-de-Port (FR)

(73) Assignee: Solvay (Societe Anonyme), Brussels (BE)

( * ) Notice: Subject to any disclaimer, the term of this patent is extended or adjusted under 35 U.S.C. 154(b) by 403 days.

(21) Appl. No.: 12/158,258

(22) PCT Filed: Dec. 19, 2006

(86) PCT No.: PCT/EP2006/069887
§ 371 (c)(1),
(2), (4) Date: Jun. 19, 2008

(87) PCT Pub. No.: WO2007/071666
PCT Pub. Date: Jun. 28, 2007

(65) Prior Publication Data
US 2008/0265069 A1 Oct. 30, 2008

(30) Foreign Application Priority Data
Dec. 23, 2005 (FR) ..................... 05 13243

(51) Int. Cl.
*B02C 23/06* (2006.01)
*B04B 15/04* (2006.01)
(52) U.S. Cl. .............. 241/16; 241/21; 241/27
(58) Field of Classification Search .............. 241/27, 241/16, 21, 22
See application file for complete search history.

(56) References Cited

U.S. PATENT DOCUMENTS

| 5,971,302 | A * | 10/1999 | Doumet ............. 241/17 |
| 6,171,567 | B1 | 1/2001 | Fagiolini |
| 2003/0122003 | A1* | 7/2003 | Schlesiger et al. ...... 241/23 |
| 2004/0113004 | A1* | 6/2004 | Schneider ............. 241/299 |

FOREIGN PATENT DOCUMENTS

| DE | 293099 | A | 8/1991 |
| DE | 10357426 | A1 | 7/2005 |
| EP | 0740577 | B1 | 11/1997 |
| GB | 635393 | A | 4/1950 |
| GB | 635394 | A | 4/1950 |
| GB | 961051 | A | 6/1964 |
| JP | 58110425 | A | 7/1983 |
| JP | 05058622 | A | 3/1993 |

OTHER PUBLICATIONS

PCT International Search Report dated Mar. 29, 2007 for International Application No. PCT/EP2006/069887 (3 pp.).
PCT International Preliminary Report on Patentability dated Jun. 24, 2008 including the Written Opinion from ISA for International Application No. PCT/EP2006/069887 (7 pp.).

* cited by examiner

*Primary Examiner* — Bena Miller
(74) *Attorney, Agent, or Firm* — Beatrice C. Ortego

(57) ABSTRACT

Process for milling a substance selected from sodium carbonate, sodium bicarbonate and sodium sesquicarbonate or trona, in which a cleaning agent is introduced into a mill for the purpose of obtaining a powder with a mean diameter of less than 100 μm and of inhibiting the formation of incrustations in the mill.

19 Claims, No Drawings

MILLING PROCESS

CROSS-REFERENCE TO RELATED APPLICATIONS

This application claims priority to French Application No. 05.13243, filed Dec. 23, 2005, the entirety of which is incorporated herein by reference.

The invention relates to the milling of substances selected from sodium carbonate, sodium bicarbonate and sodium sesquicarbonate or trona, for the continuous production of fine powders.

The invention is aimed more particularly at avoiding the incrustation of the installations used for milling such substances and/or for handling the powders obtained from the milling.

Substances such as sodium carbonate, sodium bicarbonate and sodium sesquicarbonate or trona are commonly used in the form of fine powders, for example as reactants for flue gas scrubbing. When the reactant is introduced into the flue gas, it must react rapidly with the impurities that it contains so as to obtain the desired efficiency. It is known that fine powders, having a mean particle size of less than 100 μm, advantageously 50 μm, have a larger area for contact with the flue gas to be scrubbed and react more rapidly. They are therefore preferred.

To obtain such fine powders requires intensive milling of the starting substances, preferably by means of impact mills.

However, the formation of incrustations has been observed in mills, in particular mills of the impact type, when they are used to produce powders, for example sodium bicarbonate powder, the diameter of which is less than 100 μm. The term "incrustation" is understood to mean an accumulation of milled material attached to the wall of the mill and/or to the equipment for handling the milled powder. Incrustation formation has also been observed in the installations for handling such fine sodium bicarbonate powders, especially in particle size classifiers placed downstream of the mills, or in pneumatic installations used to transfer the milled powder to a silo or an industrial plant. Incrustation of the mills and powder-handling installations obviously constitutes a disadvantage as it forces the milling and handling installations to be periodically stopped in order to clean them and remove the incrustation therefrom.

DE 10 357 426 discloses a milling process in which trimethylolpropane (TMP) is introduced into the mill.

However, the Applicant has found that TMP may contaminate the milled bicarbonate, and its presence in the bicarbonate produced may pose problems in certain applications.

The aim of the invention is to remedy the abovementioned drawbacks encountered when milling or handling sodium bicarbonate powders.

More particularly, the object of the invention is to provide a process for milling a substance, selected from sodium carbonate, sodium bicarbonate and sodium sesquicarbonate or trona, to the state of a powder with a particle size of less than 100 μm, in which incrustation of the mill and the handling installations downstream of the latter is avoided, accelerated wear of the mill is avoided and the risks of contaminating the product obtained are reduced.

Consequently, the invention relates to a process for milling a substance selected from sodium carbonate, sodium bicarbonate and sodium sesquicarbonate or trona, in which a cleaning agent is mixed with the substance and the mixture is introduced into a mill, for the purpose of obtaining a powder with a mean diameter of less than 100 μm and of inhibiting the formation of incrustations in the mill, the process being characterized in that the cleaning agent is selected from zeolites, dolomite, magnesium hydroxycarbonate, lime, hydrocarbons, talc, fatty acids and fatty acid salts.

In the process according to the invention, the expression "sodium carbonate" invariably denotes anhydrous sodium monocarbonate ($Na_2CO_3$) or hydrated sodium moncarbonate, especially sodium carbonate monohydrate ($Na_2CO_3.H_2O$), sodium carbonate heptahydrate ($Na_2CO_3.7H_2O$) or sodium carbonate decahydrate ($Na_2CO_3.10H_2O$).

The mean diameter of the powder is defined by the equation:

$$D_m = \frac{\sum n_i D_i}{\sum n_i}$$

in which $n_i$ denotes the frequency (by weight) of the particles of diameter $D_i$. These particle size parameters are defined by the laser scattering analysis method using a MASTERSIZER S measurement instrument manufactured by Malvern, used in wet mode with the MS 17 DIF 2012 accessory.

In a preferred feature of the invention, the milling is carried out in an impact mill. Within the context of the present invention, impact mills are mills in which the material to be milled is subjected to the impact of moving mechanical parts that have the effect of fragmenting the particles of material. Impact mills are well known in the fine milling art. In particular, they include (in the following non-exhausted list): hammer mills, spindle mills, attritor mills, ball mills and cage mills. Hammer mills are preferred. Hammer mills manufactured by Grinding Technologies and System SRL (model MG), by Officina 2000 SRL (model RTM) or by Hosokawa Alpine AG (model APP) are very suitable.

According to an essential feature of the invention, a cleaning agent is mixed with the substance being milled. Within the context of the invention, the term "cleaning agent" has a general definition and relates to a material capable of removing sodium carbonate, sodium bicarbonate and/or sodium sesquicarbonate or trona incrustations present in an industrial installation, mainly a metal installation. Such substances, for example lime, are known for cleaning incrustated mills. Prior to the invention, they were introduced periodically into the mill, when unacceptable incrustations appeared. According to the invention, the cleaning agent is preferably introduced continuously into the mill during its operation, and this prevents the appearance of incrustations. Surprisingly, the effectiveness of the milling is not affected thereby. It is even frequently improved, in particular when the substance to be ground is sodium bicarbonate, in the sense that the productivity of the mill is increased.

In the process according to the invention, the cleaning agent is added to and mixed with the substance before and/or during milling. It is preferable to add it before the milling.

In the process according to the invention, the substance undergoing milling is normally in the state of solid granules. The particle size of said substance is not critical for the definition of the invention, but in practice it determines the most appropriate choice of mill. It is necessary to avoid too coarse a particle size, so as to reduce the cost of milling. It is also necessary to avoid too fine a particle size, in order to avoid progressive agglutination of the particles of the substance while it is being stored. In practice, it is recommended to select a particle size of the substance characterized by a mean diameter $D_m$ greater than twice, preferably between 5 and 10 times, the mean diameter of the powder obtained.

Especially recommended particle sizes represent a mean diameter $D_m$ from 150 to 250 μm.

In the process according to the invention, the cleaning agent comprises at least one composition selected from certain abrasives, hydrocarbons and fatty acids or fatty acid salts.

When the cleaning agent comprises a solid abrasive, the abrasive is selected from silicates, oxides of metals of group 2a, hydroxides of metals of group 2a, metal salts, and in particular salts of metals of group 2a, fly ash (the ash entrained in combustion flue gases, in particular in the combustion of household waste), cellulose and starch. Zeolites, silica, dolomite, magnesium hydroxycarbonate, lime, sodium chloride, zinc chloride, sodium sulphate and calcium fluoride are preferred. Zeolites, dolomite, magnesium hydroxycarbonate and lime are particularly preferred. It has been observed that such substances, although being abrasives, do not damage the milling equipment by wear.

In one embodiment of the process according to the invention, which is especially advantageous, the cleaning agent comprises a hydrocarbon, such as fuel oil, a fatty acid or fatty acid salt selected from stearic acid, calcium stearate, magnesium stearate and soaps, such as Marseille soap. Soaps, and in particular stearates, are preferred.

The cleaning agent may comprise several of the above-mentioned substances. Advantageously, it consists completely of one or more of these substances.

In the process according to the invention, the cleaning agent must be used in at least an amount sufficient to inhibit the formation of incrustations in the mill and possibly to ensure its deincrustation, if it were to contain incrustations. In practice, the amount of cleaning agent to be employed depends on the cleaning agent selected and on the operating mill conditions (throughput, temperature, etc.). It must be determined in each particular case by routine trials. In general, it is observed that, in most cases, it is desirable for the cleaning agent to be used in an amount by weight of greater than 0.05 (preferably at least 0.1) parts by weight per 100 parts by weight of the substance being milled. Although in principle there is no upper limit of the amount of cleaning agent used, it is however not worthwhile, in practice, to use too large an amount, for cost reasons. In practice, it is therefore recommended that the amount of cleaning agent used should not exceed 20 (preferably 10) parts by weight per 100 parts by weight of the substance being milled. Amounts ranging from 0.2 to 7 parts by weight per 100 parts by weight of said substance are preferred.

If the cleaning agent is selected from solid abrasives, the recommended use thereof is an amount ranging from 0.5 to 10 (preferably 1 to 5) parts by weight per 100 parts by weight of the substance undergoing milled. If the cleaning agent is selected from fatty acids or fatty acid salts, the recommended use thereof is an amount ranging from 0.15 to 1.0 (preferably 0.2 to 0.5) parts by weight per 100 parts by weight of the substances undergoing milling.

The process according to the invention prevents the appearance of incrustations on the mill and therefore increases its capacity. It has also been observed, in particular when the cleaning agent is a fatty acid or fatty acid salt, such as stearates, that the particle size of the milled product obtained is more constant.

The process according to the invention is particularly applicable for the manufacture of sodium carbonate (either anhydrous or in hydrate form), sodium bicarbonate and sodium sesquicarbonate or trona powders, which are intended for scrubbing flue gases contaminated with volatile acid compounds (particular hydrogen chloride). This is because it has been observed, surprisingly, that the presence of the cleaning agent according to the invention in the powder intended for flue gas scrubbing does not impair its effectiveness. This observation is particularly beneficial in the case of fatty acid salts.

Consequently, the invention also relates to a process for scrubbing a flue gas contaminated by a volatile acid compound, in which a reactant selected from sodium carbonate, sodium bicarbonate and sodium sesquicarbonate or trona is subjected to a milling operation in order to reduce it to the state of a powder with a mean diameter of less than 50 μm, and said powder is injected into the flue gas, the scrubbing process being characterized in that the milling is carried out by means of the milling process according to the invention, as defined above.

It is well known in the art to scrub flue gases so as to remove volatile acid compounds by means of a pulverulent reactant selected from anhydrous and hydrated sodium carbonates, sodium bicarbonate and sodium sesquicarbonate or trona. This has been described in document EP 0740577B1 [SOLVAY (Société Anonyme)].

The scrubbing process according to the invention is particularly applicable for scrubbing flue gases contaminated by hydrogen chloride, particularly flue gases generated by incinerators for household or municipal waste and incinerators for hazardous waste. It has been observed that the presence of a cleaning agent according to the invention, particularly stearates, in the reactant ensures better dispersion of the latter in the gas stream. This improves the effectiveness of the scrubbing.

When implementing the scrubbing process according to the invention, the powder collected from the milling operation usually undergoes a particle size classification before its injection into the flue gas, said injection normally being carried out by means of a mechanical blower.

The function of the particle size classification is to divide the powder into a useful particle size class (intended to be injected into the flue gas) and into one or more finer or coarser particle size classes to be injected into the flue gas. The particle size classification may be carried out by any suitable known classifier, for example a series of screens or an elutriator.

The blower must be designed to convey a powder in a stream of air. It is generally of the centrifugal type. In the process according to the invention, the blower may be located upstream or downstream of the particle size classification. It is normally located downstream of the milling.

In the scrubbing process according to the invention, the milling and classification are advantageously regulated so that the powder introduced into the flue gas has a particle size characterized by a mean diameter $D_m$ of less than 50 μm and a particle size slope of less than 5, the particle size slope being defined by the equation:

$$\sigma = \frac{D_{90} - D_{10}}{D_m},$$

in which $D_{90}$ (and $D_{10}$) represent, respectively, the diameter for which 90% and 10%, respectively, of the particles of the powder (expressed by weight) have a diameter of less than $D_{90}$ and $D_{10}$, respectively. These particle size parameters are defined by the laser scattering analysis method using a measurement apparatus such as those described above. Preferred particle sizes for the powder injected into the flue gas correspond to a mean particle diameter of 10 to 30 μm and a particle size slope of 1 to 3. Further information regarding the optimum particle size parameters can be obtained from the patent EP 0 740 577 B1 mentioned above [SOLVAY (Société Anonyme)].

The particle size classifiers and blowers used in the scrubbing process according to the invention run the risk of being progressively incrusted with particles of the reactive powder, which is a disadvantage.

As a consequence, the invention also relates to a process for inhibiting the incrustation of an installation for handling a powder with a mean diameter of less than 50 µm, selected from sodium carbonate, sodium bicarbonate and sodium sesquicarbonate or trona, said process being characterized in that a cleaning agent according to those used and preferred in the milling process according to the invention is mixed with said powder.

The invention also relates to a process for removing, in an installation for handling a powder, incrustations selected from sodium carbonate, sodium bicarbonate and sodium sesquicarbonate or trona, the process being characterized in that a cleaning agent according to those used and preferred in the milling process according to the invention is introduced into the installation.

The processes according to the invention for inhibiting incrustation and for deincrustation respectively, are applicable for installations for handling reactants used in the flue gas scrubbing process according to the invention defined above. It applies especially to installations that include a particle size classifier for treatment of said reactant and a mechanical blower for injecting it into the flue gas to be scrubbed.

The following examples serve to illustrate the invention.

In these examples, a TEC of 0/50 bicarbonate [from SOLVAY(Société Anonyme)], having a mean particle diameter of about 200 µm, was used as starting substance.

EXAMPLE 1

Not According to the Invention

In this example, the aforementioned sodium bicarbonate was milled, as such, in a hammer mill of the ALPINE brand, model 100 UPZ, fitted with spindle discs, under the following conditions:

rotation speed of the rotor of the mill: 15 000 rpm;

feed rate of substance: 3 kg/h.

The milling was regulated so as to obtain, thereafter, a sodium bicarbonate powder having a mean particle diameter of about 10 µm.

After 6 hours of operation, the presence of a thick incrustation layer was observed on the rotor and on the stator of the mill. Reducing the milling rate to 1 kg/h did not modify the appearance of the incrustations.

EXAMPLE 2

According to the Invention

In this example, fly ash was mixed with the 0/50 BICAR sodium bicarbonate in an amount by weight of 5 parts per 100 parts by weight of bicarbonate. The mixture was produced in a Lödige laboratory blender. The homogenous blend obtained was milled under the same conditions as in Example 1.

After 6 hours of operation, no substantial incrustation could be detected on the rotor and on the stator of the mill.

EXAMPLE 3

According to the Invention

The trial of Example 2 was repeated, using officinal talc as cleaning agent.

After 6 hours of operation, no substantial incrustation could be detected on the rotor and on the stator of the mill.

EXAMPLE 4

According to the Invention

The trial of Example 2 was repeated, except that 0.2% of calcium stearate was used as cleaning agent.

After 6 hours of operation, no substantial incrustation could be detected on the rotor and on the stator of the mill. This performance was maintained after the milling rate was increased to 6 kg/h.

The invention claimed is:

1. A process for milling a substance selected from the group consisting of sodium carbonate, sodium bicarbonate, sodium sesquicarbonate, and trona, comprising:
   mixing a cleaning agent with the substance, and milling the mixture into a mill, for the purpose of obtaining a powder with a mean diameter of less than 100 µm and of inhibiting the formation of incrustations in the mill, wherein the cleaning agent comprises at least one composition selected from the group consisting of zeolites, dolomite, magnesium hydroxycarbonate, lime, sodium chloride, zinc chloride, sodium sulfate, calcium fluoride, hydrocarbons, talc, fly ash, fatty acids, and fatty acid salts.

2. The process according to claim 1, wherein the cleaning agent comprises a fatty acid or a fatty acid salt.

3. The process according to claim 2, wherein the fatty acid or fatty acid salt is selected from the group consisting of calcium stearate, and magnesium stearate.

4. The process according to claim 2, wherein the amount of cleaning agent used ranges from 0.15 to 1.0 parts by weight per 100 parts by weight of the substances undergoing milling.

5. The process according to claim 2, wherein the fatty acid or fatty acid salt is stearic acid or a stearate.

6. The process according to claim 1, wherein the powder possesses a mean diameter of less than 75 µm.

7. The process according to claim 1, wherein the cleaning agent is employed in an amount from 0.2 to 7 parts by weight per 100 parts by weight of the substance.

8. The process according to claim 1, wherein the substance is employed in the state of granules with a mean diameter of greater than twice that of the powder obtained.

9. The process according to claim 1, wherein the mill is an impact mill.

10. The process according to claim 9, wherein the impact mill comprises a hammer mill.

11. The process according to claim 1, wherein the substance is employed in the state of granules with a mean diameter $D_m$ of particle sizes from 150 to 250 µm.

12. The process according to claim 1, wherein the substance is employed in the state of particles with a mean diameter of between 5 and 10 times greater than the mean diameter of the powder obtained.

13. The process according to claim 1, wherein the amount of cleaning agent used does not exceed 20 parts by weight per 100 parts by weight of the substance being milled.

14. The process according to claim 1, wherein the powder possesses a mean particle diameter of less than 50 μm.

15. The process according to claim 14, wherein the powder has a particle size slope of less than 5.

16. The process according to claim 14, wherein the powder has a mean particle diameter between 10 and 30 μm and a particle size slope from 1 to 3.

17. The process according to claim 1, wherein the cleaning agent is added to and mixed with the substance before milling.

18. The process according to claim 1, wherein the cleaning agent is added to and mixed with the substance during milling.

19. The process according to claim 1, wherein the cleaning agent is introduced continuously into the mill during its operation and mixed with the substance to prevent the appearance of incrustations in the mill.

* * * * *